United States Patent
Walker

(10) Patent No.: US 7,562,944 B2
(45) Date of Patent: Jul. 21, 2009

(54) HYDRAULIC REGENERATIVE BRAKING SYSTEM FOR A VEHICLE

(76) Inventor: Frank H. Walker, 8087 Hawkcrest Dr., Grand Blanc, MI (US) 48439

( * ) Notice: Subject to any disclaimer, the term of this patent is extended or adjusted under 35 U.S.C. 154(b) by 222 days.

(21) Appl. No.: 10/535,354

(22) PCT Filed: Dec. 16, 2003

(86) PCT No.: PCT/US03/40096

§ 371 (c)(1),
(2), (4) Date: May 18, 2005

(87) PCT Pub. No.: WO2004/058550

PCT Pub. Date: Jul. 15, 2004

(65) Prior Publication Data

US 2006/0055238 A1    Mar. 16, 2006

Related U.S. Application Data

(60) Provisional application No. 60/433,566, filed on Dec. 16, 2002, provisional application No. 60/441,194, filed on Jan. 21, 2003, provisional application No. 60/452,714, filed on Mar. 10, 2003, provisional application No. 60/514,983, filed on Oct. 29, 2003, provisional application No. 60/523,337, filed on Nov. 20, 2003.

(51) Int. Cl.
*B60T 13/16* (2006.01)
(52) U.S. Cl. .................... 303/10; 303/116.4
(58) Field of Classification Search ............ 303/10, 303/11, 116.4, 152; 417/269, 270, 204; 91/6.5, 91/491; 180/242, 243; 418/147, 30, 132, 418/133, 225, 236
See application file for complete search history.

(56) References Cited

U.S. PATENT DOCUMENTS 3,796,136 A    3/1974    Oguni
3,852,998 A    12/1974   Leeson (Continued)

FOREIGN PATENT DOCUMENTS

JP        8-144927       6/1996

(Continued)

OTHER PUBLICATIONS

Peter A.J. Achten et al., Transforming Future Hydraulics: A New Design Of A Hydraulic Transformer, Abstract, reprint from Proceedings of The Fifth Scandinavian International Conference on Fluid Power, 1997, part 3, Linköping University, 1 page.

(Continued)

*Primary Examiner*—Christopher P Schwartz
(74) *Attorney, Agent, or Firm*—Brooks Kushman P.C.

(57) ABSTRACT

A hydraulic regenerative braking system for a vehicle is provided. The system includes two hydraulic machines, each of which is disposed proximate a corresponding vehicle wheel. A transformer is in communication with each of the hydraulic machines, and with a pair of accumulators. Each of the hydraulic machines is operable as a pump, pumping fluid to at least one of the accumulators when the vehicle is braking. Each of the hydraulic machines is also operable as a motor, receiving pressurized fluid and transferring torque to the vehicle wheels. The transformer is operable to vary the pressure of the fluid received by the hydraulic machines.

19 Claims, 12 Drawing Sheets

U.S. PATENT DOCUMENTS

| | | | |
|---|---|---|---|
| 3,908,519 A * | 9/1975 | Born et al. ............... 92/12.2 |
| 3,910,043 A | 10/1975 | Clerk |
| 4,051,765 A | 10/1977 | Saito |
| 4,297,086 A * | 10/1981 | McGowan ............... 417/271 |
| 4,459,084 A | 7/1984 | Clark |
| 4,540,345 A * | 9/1985 | Frazer ............... 417/269 |
| 4,883,141 A | 11/1989 | Walker |
| 4,934,251 A * | 6/1990 | Barker ............... 91/486 |
| 4,993,780 A | 2/1991 | Tanaka et al. |
| 5,000,282 A | 3/1991 | Walker |
| 5,101,925 A | 4/1992 | Walker |
| 5,211,015 A | 5/1993 | Schroeder |
| 5,263,401 A | 11/1993 | Walker |
| 5,323,688 A | 6/1994 | Walker |
| 5,473,893 A | 12/1995 | Achten et al. |
| 5,482,445 A | 1/1996 | Achten et al. |
| 5,507,144 A | 4/1996 | Gray, Jr. et al. |
| 5,540,193 A | 7/1996 | Achten et al. |
| 5,556,262 A | 9/1996 | Achten et al. |
| 5,829,393 A | 11/1998 | Achten et al. |
| 5,839,889 A | 11/1998 | Folsom et al. |
| 5,971,092 A | 10/1999 | Walker |
| 5,983,638 A | 11/1999 | Achten et al. |
| 6,024,420 A | 2/2000 | Yonemura et al. |
| 6,033,040 A | 3/2000 | Inagaki et al. |
| 6,116,138 A | 9/2000 | Achten |
| 6,116,871 A | 9/2000 | Backe et al. |
| 6,142,581 A | 11/2000 | Yamaguchi et al. |
| 6,206,656 B1 | 3/2001 | Bailey et al. |
| 6,223,529 B1 | 5/2001 | Achten |
| 6,279,517 B1 | 8/2001 | Achten |
| 6,446,435 B1 | 9/2002 | Willmann et al. |
| 6,470,677 B2 | 10/2002 | Bailey |
| 6,537,047 B2 | 3/2003 | Walker |
| 6,575,076 B1 | 6/2003 | Achten |
| 6,623,260 B2 * | 9/2003 | White ............... 418/61.3 |
| 6,641,232 B1 | 11/2003 | Alaze |
| 6,719,080 B1 | 4/2004 | Gray, Jr. |
| 6,773,368 B1 | 8/2004 | Williams |
| 6,811,510 B1 * | 11/2004 | Langenfeld et al. ........... 475/83 |
| 6,905,321 B2 | 6/2005 | Uchiyama et al. |
| 2001/0036411 A1 * | 11/2001 | Walker ............... 417/204 |

FOREIGN PATENT DOCUMENTS

WO    2006066156 A2    6/2006

OTHER PUBLICATIONS

Peter A.J. Achten et al., What A Difference A Hole Makes—The Commercial Value Of The Innas Hydraulic Transformer, Abstract, The Sixth Scandinavian International Conference on Fluid Power, May 26-29, 1999, Tampere, Finland, 1 page.

Georges Vael et al., Cylinder Control With The Floating Cup Hydraulic Transformer, The Eighth Scandinavian International Conference on Fluid Power, May 7-9, 2003, Tampere, Finland, 16 pages.

Peter Achten et al., Design And Testing Of An Axial Piston Pump Based On The Floating Cup Principle, The Eighth Scandinavian International Conference on Fluid Power, May 7-9, 2003, Tampere, Finland, 16 pages.

Rob A.H. van Malsen et al., Design of Dynamic and Efficient Hydraulic Systems Around a Simple Hydraulic Grid, 2002, SAE 2002-01-1432, pp. 1-9.

Georges E.M. Vael et al., The Innas Hydraulic Transformer—The Key to the Hydrostatic Common Pressure Rail, 2000, SAE 2000-01-2561, 16 pages.

R. P. Kepner, Hydraulic Power Assist—A Demonstration of Hydraulic Hybrid Vehicle Regenerative Braking in a Road Vehicle Application, SAE Technical Paper Series, 2002, SAE 2002-01-3128, 8 pages.

Peter A.J. Achten et al., 'Shuttle' technology for noise reduction and efficiency improvement: of hydrostatic machines, The Seventh Scandinavia International Conference on Fluid Power, 2001, Linköping, Sweden, pp. 1-4.

Peter A.J. Achten et al., Valving Land Phenomena Of The Innas Hydraulic Transformer, Abstract, 1 page.

G.E.M. Vael et al., Some Design Aspects of the Floating Cup Hydraulic Transformer, 16 pages.

Peter A.J.Achten, Designing the impossible pump, pp. 1-15.

Design News, "Hydraulic Motor Adds speed Equipment", Apr. 26, 2004, p. 38.

International Search Report, mailed Jul. 18, 2008, 1 page.

* cited by examiner

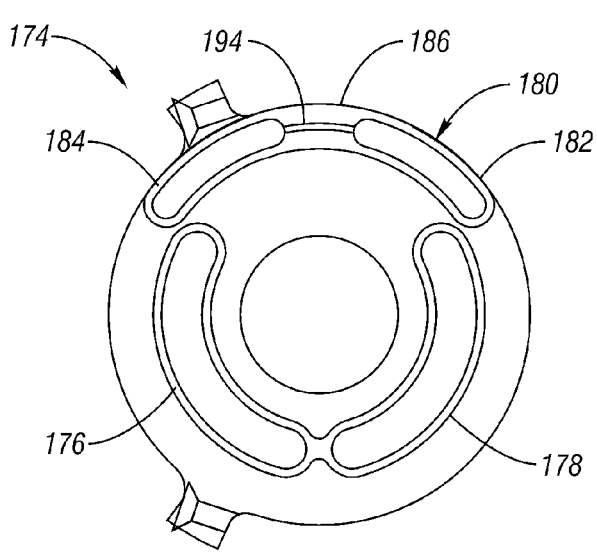
*Fig. 10*
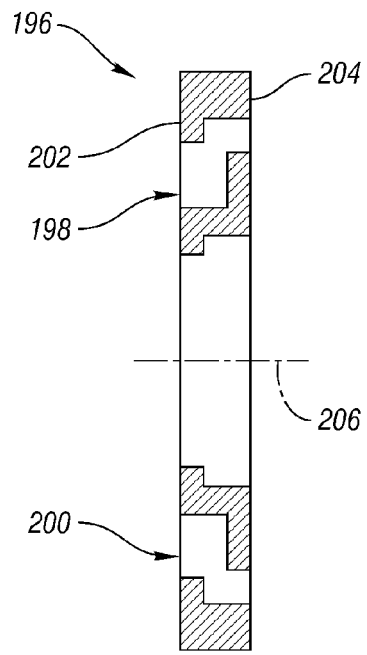
*Fig. 11*
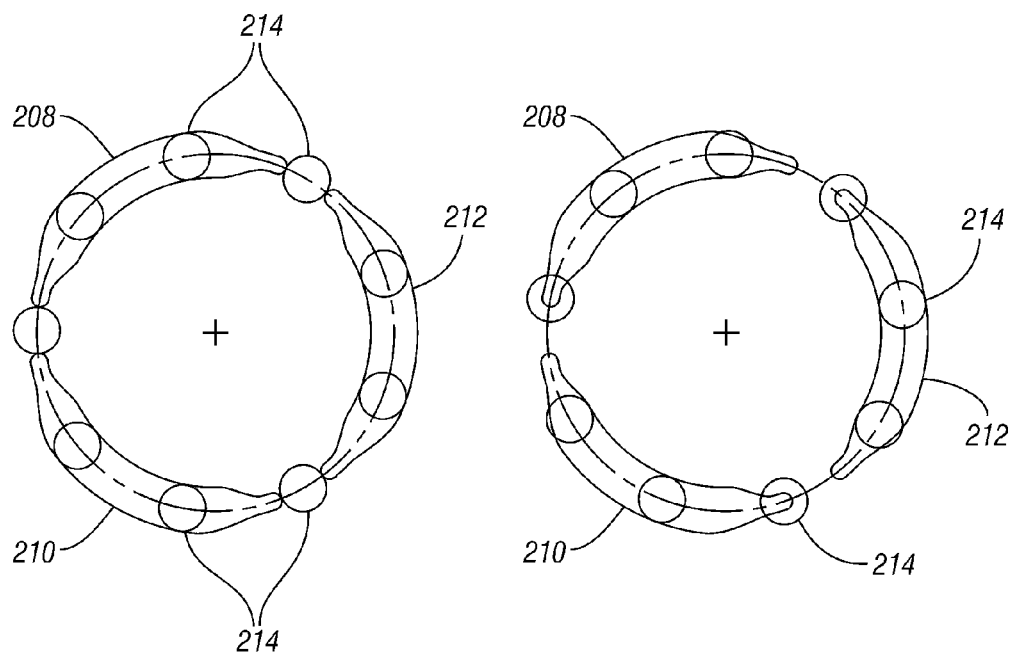
*Fig. 12A*    *Fig. 12B*

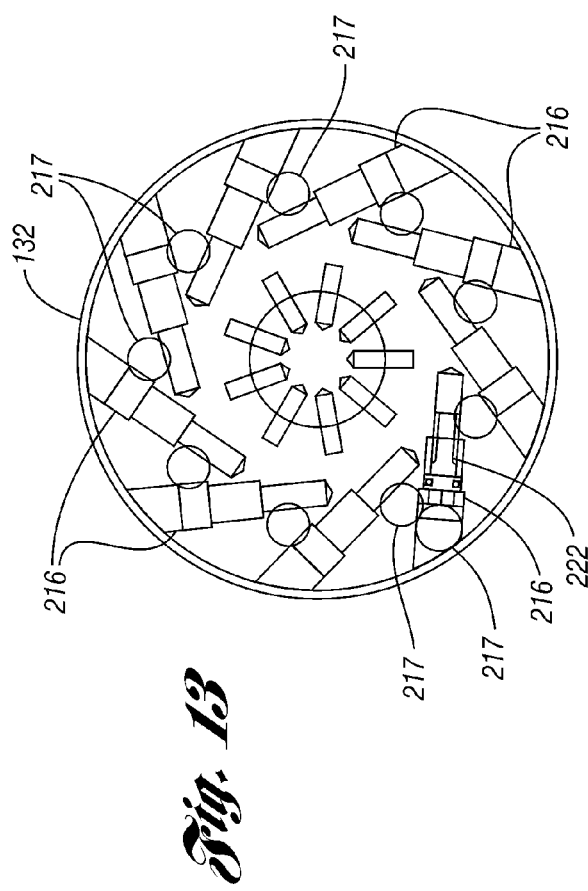
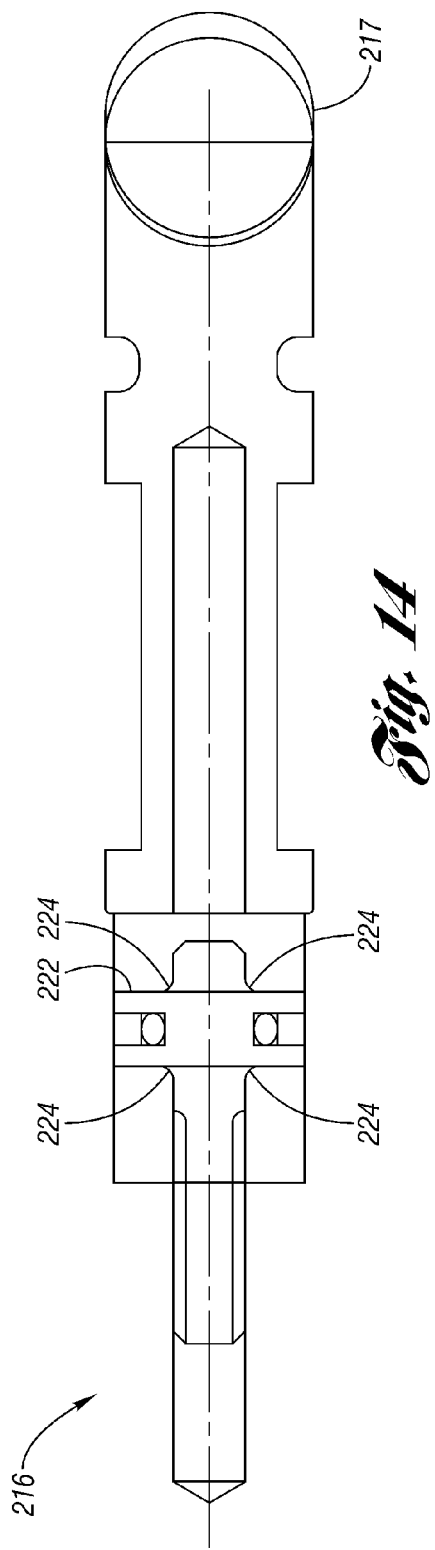

HYDRAULIC REGENERATIVE BRAKING SYSTEM FOR A VEHICLE

CROSS-REFERENCE TO RELATED APPLICATIONS

This application claims the benefit of: U.S. provisional application Ser. Nos. 60/433,566 filed Dec. 16, 2002; 60/441,194 filed Jan. 21, 2003; 60/452,714 filed Mar. 10, 2003; 60/514,983 filed Oct. 29, 2003; and 60/523,337 filed Nov. 20, 2003.

BACKGROUND OF THE INVENTION

1. Field of the Invention

The present invention relates to a hydraulic regenerative braking system for a vehicle.

2. Background Art

It is well known that hydraulic regenerative systems promise improved efficiency over electric regenerative systems incorporating a battery. Hydraulic regeneration involves using a pump, connected in the vehicle drive train, as a retarding device, and then storing the resulting high pressure fluid in an accumulator. On the subsequent vehicle acceleration, the high pressure fluid from the accumulator is routed to a hydraulic motor and the stored energy is recovered in the form of mechanical work which drives the vehicle forward. A low pressure accumulator acts as a reservoir to make up for fluid volume variations within the high pressure accumulator, and also provides a charge pressure to the inlet side of the pump.

Since the accumulator pressure is determined by a gas precharge level in the accumulator, and by the volume change from additional fluid added, the current method of modulating braking and driving forces in hydraulic regenerative systems has been to incorporate a variable displacement device to operate in concert with the fixed pressure accumulator. Variable displacement hydraulic devices can be efficient, but they are typically bulky, heavy and expensive, and do not package easily in automotive passenger vehicles. In addition, space is often limited in the front of a vehicle, yet, because the front wheels of a vehicle typically support 60% of the vehicle mass, plus whatever weight transfer takes place as a result of the vehicle deceleration, an effective regenerative braking system must incorporate braking on the front wheels.

Thus, the packaging problem is further compounded, since the drive train of front wheel drive vehicles is typically very tightly packaged. This leaves little room to add a variable displacement hydraulic device which can operate as a hydraulic pump during braking and a hydraulic motor during acceleration. Fixed displacement pump-motors, or pump-motors having limited variable displacement, may require less space, but may not provide the functionality required of a regenerative braking system. Therefore, a need exists for a hydraulic regenerative braking system that can conserve space by using fixed displacement, or limited variable displacement, pump-motors.

In addition to the packaging problems discussed above, hydraulic pump motors are often undesirably large as a result of their design. In particular, a hydraulic pump-motor that uses pistons, and has a cam that is disposed outside the pistons, may be too large to incorporate into a regenerative braking system on many vehicles. Therefore, a need exists for a hydraulic pump-motor that includes a cam for actuating the pistons, where the cam is disposed inboard of the pistons, thereby conserving space by providing a smaller pump-motor.

SUMMARY OF THE INVENTION

Accordingly, the present invention provides a hydraulic regenerative braking system that can conserve space by using fixed displacement, or limited variable displacement, pump-motors.

The invention also provides a hydraulic regenerative braking system that uses a hydraulic transformer to effect changes in fluid pressure within the system, thereby eliminating the need for a variable displacement pump-motor.

The invention further provides a hydraulic pump-motor that includes a cam for actuating the pistons, where the cam is disposed inboard of the pistons, thereby conserving space by providing a smaller pump-motor.

The invention also provides a hydraulic regenerative braking system for a vehicle. The system includes at least one hydraulic machine operable as a pump configured to be driven by energy received from at least one vehicle wheel when the vehicle is braking, thereby facilitating storage of vehicle braking energy. The at least one hydraulic machine is further operable as a motor configured to be driven by stored braking energy, thereby providing torque to at least one vehicle wheel. A first accumulator is configured to receive fluid from the at least one hydraulic machine, and to store the fluid under pressure. The first accumulator is further configured to provide pressurized fluid to the at least one hydraulic machine, thereby facilitating use of the hydraulic machine as a motor. A second accumulator is configured to store pressurized fluid and to provide a charge pressure to an inlet of the at least one hydraulic machine. A variable ratio transformer is in communication with the first and second accumulators and the at least one hydraulic machine. The transformer is operable to vary the pressure of the pressurized fluid provided to the at least one hydraulic machine, thereby facilitating variation in the torque provided to the at least one vehicle wheel. The transformer is further operable to vary the pressure of the fluid received by the first accumulator. A control module is configured to receive inputs related to operation of the vehicle, and to control operation of the transformer. The inputs include an acceleration request and a braking request.

The invention further provides a hydraulic machine operable as a pump configured to be driven by a rotating shaft, thereby increasing the pressure of fluid flowing through the pump. The hydraulic machine is further operable as a motor configured to be driven by pressurized fluid, thereby providing torque to a shaft. The hydraulic machine includes a housing, including a high pressure fluid port and a low pressure fluid port. The hydraulic machine also includes a plurality of radial pistons. Each of the pistons is configured to reciprocate within a corresponding cylinder in the housing, thereby pumping fluid when the hydraulic machine is operating as a pump, and providing torque when the hydraulic machine is operating as a motor. Each of the pistons includes a corresponding cam follower. A cam is disposed within the housing, and has a plurality of external lobes configured to cooperate with the cam followers to translate rotational motion of the cam into linear motion of the pistons when the hydraulic machine is operating as a pump, and to translate linear motion of the pistons into rotational motion of the cam when the hydraulic machine is operating as a motor. The cam includes an aperture therethrough for receiving a rotatable shaft. A rotatable valve plate has a plurality of apertures therethrough; at least some of the apertures communicate with the high pressure fluid port and at least some of the apertures communicate with the low pressure fluid port. The valve plate is configured to provide a fluid path between the cylinders and the high pressure fluid port when corresponding pistons are in a power stroke and between the cylinders and the low pressure fluid port when corresponding pistons are in an exhaust stroke, thereby facilitating operation of the hydraulic machine as a motor. The valve plate is further configured to provide a fluid path between the cylinders and the high pressure fluid port when corresponding pistons are in an exhaust stroke and between the cylinders and the low pressure fluid port when corresponding pistons are in a power stroke, thereby facilitating operation of the hydraulic machine as a pump.

The invention also provides a variable pressure ratio hydraulic transformer for modifying the pressure, flow rate, or a combination thereof, of fluid flowing through the transformer. The transformer includes a housing having at least three housing ports. Each of the housing ports is configured to operate as a fluid inlet or as a fluid outlet. A rotor is rotatably disposed within the housing. A plurality of pistons is attached to the rotor. Each of the pistons include a shaft having a generally spherical end, and a head configured to cooperate with the generally spherical end of the shaft, thereby allowing the head to pivot relative to the shaft. The transformer further includes a plurality of cylinders. Each of the cylinders is configured to receive a corresponding piston, and has a cylinder axis non-parallel to a corresponding piston shaft. A first plate is configured to be rotatably driven by the rotor, and has a first surface configured to contact one end of each of the cylinders and to allow each of the contacting cylinder ends to slide relative to the first surface. The first plate includes a plurality of apertures therethrough, at least some of which are configured to facilitate fluid flow to and from the cylinders. A second plate has at least three plate ports therein. Each of the plate ports is configured to cooperate with at least one aperture in the first plate and one housing port, thereby facilitating fluid flow between a housing port and at least one cylinder. The second plate is rotatable relative to the housing ports to modify the transformer pressure ratio.

The invention further provides a compact hydraulic machine operable as a pump and a motor, and configured to be disposed on a vehicle driving shaft proximate a vehicle wheel. The hydraulic machine includes a housing which has a first housing portion, a second housing portion, and an outer ring. The first housing portion includes a high pressure fluid port and a low pressure fluid port. The second housing portion includes a plurality of radially oriented cylinders disposed therein, and the outer ring includes a tapered bore to facilitate sealing of each of the cylinders. The hydraulic machine also includes a plurality of pistons, each of which includes a cam follower, and each of which is configured to reciprocate within a corresponding cylinder. A cam is disposed within the housing, and has a plurality of external lobes configured to cooperate with the cam followers to translate rotational motion of the cam into linear motion of the pistons when the hydraulic machine is operating as a pump, and to translate linear motion of the pistons into rotational motion of the cam when the hydraulic machine is operating as a motor. The cam includes an aperture therethrough for receiving a rotatable shaft. A rotatable valve plate has a plurality of apertures therethrough, and is configured to selectively connect the cylinders with the low and high pressure fluid ports, thereby alternately facilitating operation of the hydraulic machine as a pump and a motor.

The invention also provides a method for operating a vehicle having a hydraulic regenerative braking system. The regenerative braking system includes at least one hydraulic machine operable as a pump and a motor, and operable to receive energy from, and provide energy to, at least one vehicle wheel. The regenerative braking system also includes first and second accumulators for storing and providing pressurized fluid, and a variable ratio transformer operable to vary the pressure of fluid provided to the at least one hydraulic machine and to vary the pressure of fluid provided to the first accumulator. The method includes operating the at least one hydraulic machine as a pump during a vehicle braking event. During the braking event, the at least one hydraulic machine is driven by energy received from the at least one vehicle wheel, thereby providing pressurized fluid to at least the first accumulator to store the pressurized fluid. The transformer is selectively operated to vary the pressure of the fluid provided to the first accumulator during the vehicle braking event. The at least one hydraulic machine is operated as a motor during a vehicle driving event; it is driven by pressurized fluid provided from at least the first accumulator, thereby providing torque to the at least one vehicle wheel. The transformer is selectively operated to vary the pressure of the fluid provided to the at least one hydraulic machine during the vehicle driving event.

BRIEF DESCRIPTION OF THE DRAWINGS

FIG. 10 is a side view of a port plate shown in FIG. 5;

FIG. 11 is a sectional view of an alternative embodiment of the port plate shown in FIG. 10;

FIGS. 12A and 12B show projections of ports in a port plate and apertures in a barrel which can be used in a hydraulic transformer;

FIG. 13 is a side view of the rotor shown in FIG. 7, illustrating shuttle valves in the rotor;

FIG. 14 is a detail view of a shuttle valve shown in FIG. 13;

DETAILED DESCRIPTION OF THE PREFERRED EMBODIMENT(S)

Figure 1:
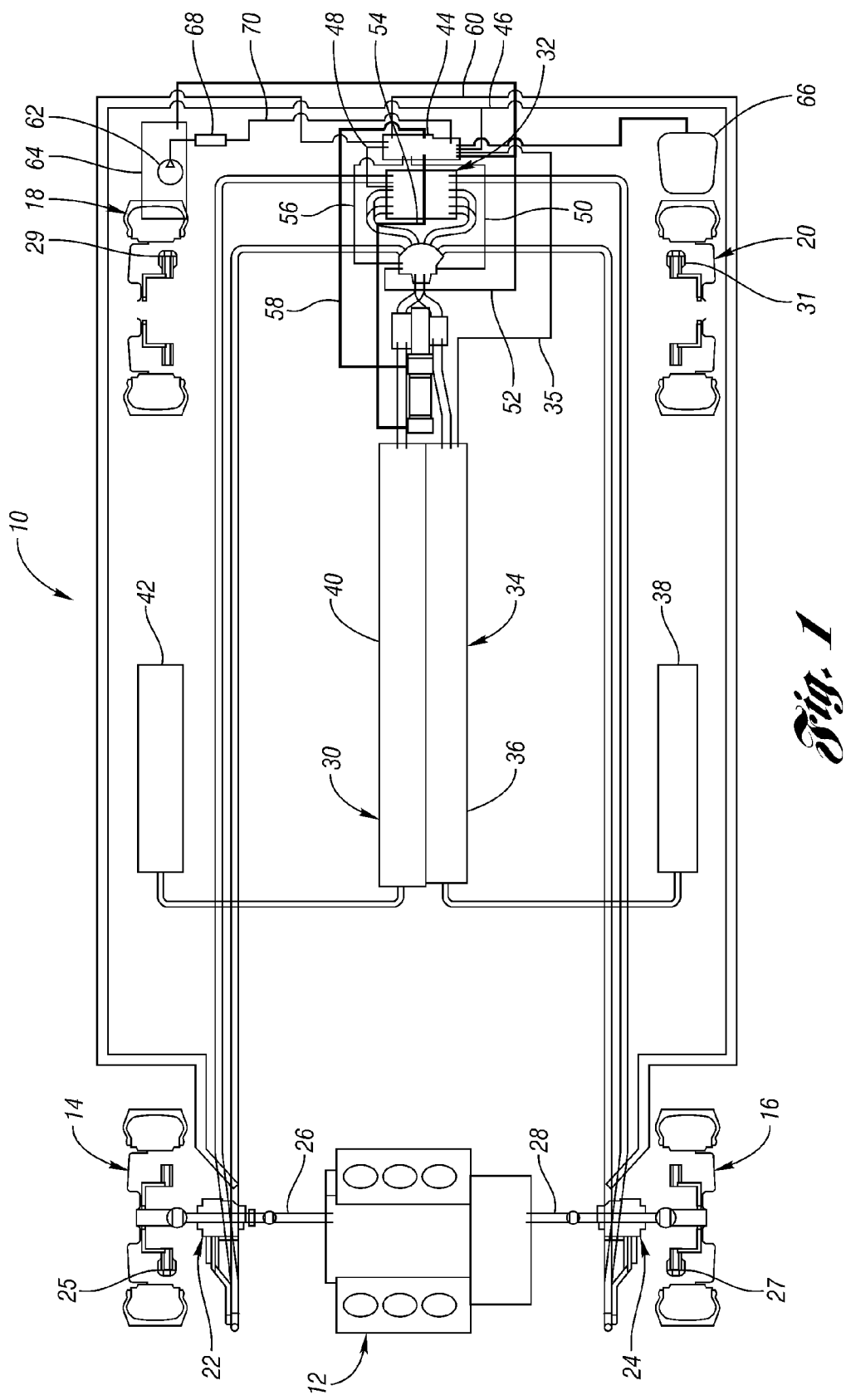
FIG. 1 is a schematic representation of a system in accordance with a first embodiment of the present invention.

FIG. 1 shows a schematic representation of a hydraulic regenerative braking system 10 for a vehicle in accordance with the present invention. The vehicle, not shown in its entirety, includes an engine 12 and four wheels 14, 16, 18, 20. The regenerative braking system 10 includes two hydraulic machines, or pump-motors 22, 24. Each of the pump-motors 22, 24, is mounted on a respective driving shaft 26, 28 of the vehicle. Each pump-motor 22, 24 includes a torque arm 29—see FIG. 15B—which attaches to a ball-ended link to a secure mounting point on the vehicle chassis. As explained more fully below, each of the pump-motors 22, 24 is operable as a pump, driven by energy received from the respective vehicle wheels 14, 16 while the vehicle is braking.

The pump-motors 22, 24 pump fluid into a first, or high pressure accumulator 30, where the high pressure fluid is stored for later use. The pump-motors 22, 24 are also operable as motors, driven by fluid from the high pressure accumulator 30. Thus, the braking energy stored in the high pressure accumulator 30 is used to operate the pump-motors 22, 24 as motors to provide torque to the wheels 14, 16. In addition to the regenerative braking system 10, the vehicle also includes a friction braking system, illustrated in FIG. 1 by calipers 25, 27, 29, 31, at respective wheels 14, 16, 18, 20.

The regenerative braking system 10 also includes a variable ratio hydraulic transformer 32 which is configured to vary the pressure of the pressurized fluid provided to the pump-motors 22, 24 or received by the high pressure accumulator 30. By using a variable ratio transformer, such as the transformer 32, the pump-motors 22, 24 can be fixed displacement, which provides for significant space reduction near the wheels, when compared to traditional hydraulic regenerative systems, which employ variable displacement pump-motors. The transformer 32 communicates with the pump-motors 22, 24, the high pressure accumulator 30, and with a second, or low pressure accumulator 34. The low pressure accumulator 34 is used as a reservoir, which can either provide fluid to the transformer 32 to increase the pressure of the fluid provided to the pump-motors 22, 24, or the low pressure accumulator 34 can receive fluid from the transformer 32 when it is in a step-down mode.

The low pressure accumulator 34 also provides a charge pressure—i.e., a relatively low pressure—to the pump-motors 22, 24, through a charge pressure fluid line 35. The charge pressure helps to ensure that there is always some liquid supplied to the pump-motors 22, 24, thereby avoiding cavitation. The low pressure accumulator 34 includes two parts: a liquid/gas container 36, and a gas only container 38. Similarly, the high pressure accumulator 30 includes two parts: a liquid/gas container 40, and a gas only container 42. Configuring each of the accumulators 30, 34 with two containers facilitates packaging by reducing the size of the liquid/gas container. Of course, high and low pressure accumulators, such as the high and low pressure accumulators 30, 34, may include a single liquid/gas container, rather than the two-part configuration shown in FIG. 1.

The two container arrangement takes advantage of residual volume for gas in the accumulator which is available after the accumulator piston (not shown) is at the end of its stroke. The gas only containers 38, 42 may be approximately 30% of the total respective accumulator volume, though different sizes of gas only containers may be used. To increase efficiency of the accumulators 30, 34, the gas side of each liquid/gas container 36, 40, and the gas only containers 38, 42, may be filled with an open cell foam, such as polyester, to help to ensure that compression and expansion of the gas occurs at constant temperature.

The regenerative braking system 10 also includes a control module 44, which controls operation of the transformer 32. The control module 44 receives inputs related to operation of the vehicle. Such inputs include driver initiated acceleration requests and braking requests. The control module 44 uses the inputs to effect operation of the transformer suitable to the vehicle operation. In addition to electronic inputs, the control module 44 also uses fluid lines 46, 48, 50, 52, 54, 56, 58, 60 to detect various fluid pressures in the system 10, and to control operation of the transformer 32. The control module 44 also controls operation of a small pump 62 that resides in a sump tank 64. The sump tank 64 receives fluid from various parts of the system 10, as a result of, for example, fluid leakage. The pump 62 is configured to pump scavenged fluid from the sump tank 64, to a small low pressure accumulator 66. A filter 68 is provided on fluid line 70 to help ensure that debris from the scavenged fluid is not pumped to the control module 44.

Figure 2:
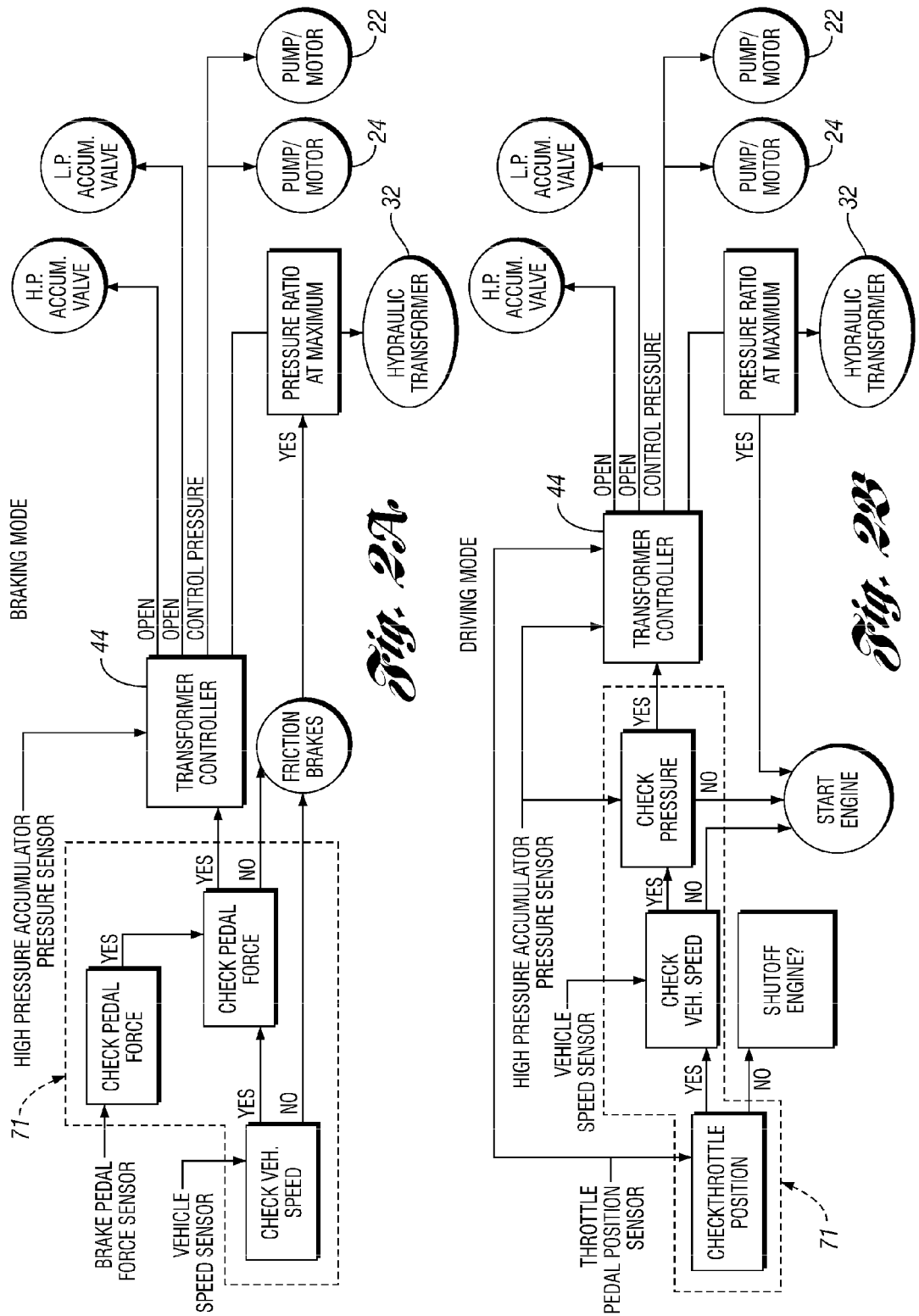
FIGS. 2A and 2B are control logic diagrams illustrating control logic that can be used with the system shown in FIG. 1.

The control module 44 is programmed with appropriate control logic to facilitate functionality of the system 10. FIGS. 2A and 2B respectively show one possible control logic scheme for when the vehicle is in a braking mode and when it is in a driving mode. Some of the control logic illustrated in FIGS. 2A and 2B may reside in another controller—e.g., a vehicle system controller (VSC) 71—which communicates with the control module 44. For example, in the braking mode, the VSC 71 receives inputs from a high pressure accumulator pressure sensor, a vehicle brake pedal force sensor, and a vehicle speed sensor. Of course, additional inputs may also be used. Using the inputs, the VSC 71 determines if the pedal force is greater than a first predetermined force, for example, 1 lb; if not, it assumes the vehicle is not in a braking mode. If the pedal force is greater than one pound, the control module 44 then determines if it is less than a second predetermined force, for example, 40 lb. If the braking force is not less than 40 lb., the friction brakes are used to stop the vehicle. If, however, the braking force is between 1 lb. and 40 lb., the VSC 71 signals the control module 44, and regenerative braking is employed.

In addition to the brake pedal force, the control logic also uses the vehicle speed to determine whether regenerative braking should be used. For example, at high speeds—e.g., 50 miles per hour (mph) or more—the friction brakes are used, since the pump rotational speed is high, and the flow rate may exceed the maximum flow capacity of the system 10. Moreover, at very low speeds—e.g., less than 3 mph—the friction brakes are also used. This is because regenerative braking provides negative torque to the vehicle wheels, and once the vehicle speed reaches zero, continued application of regenerative braking torque could cause the vehicle to move in reverse.

Once the control module 44 is signaled to use regenerative braking, it effects opening of valves on the high and low pressure accumulators 30, 34, sends control pressure to the pump-motors 22, 24, and sets the pressure ratio of the transformer 32. If the pressure ratio of the transformer 32 is at a maximum, or the pressure of the pump-motors 22, 24 is at a maximum, the friction brakes are used in addition to regenerative braking. If, however, the pressure ratio is not at a maximum, and the pressure of the pump-motors 22, 24 is not at a maximum, the transformer 32 is used to generate the pressure required by the pump-motors 22, 24 to comply with the stopping rate commanded by the vehicle operator.

The control logic for the driving mode is shown in FIG. 2B. A vehicle speed sensor and a throttle position sensor provide inputs into the VSC 71. The VSC 71 then determines whether the throttle position is greater than zero. If it is not, it may be possible to shutdown the engine to save fuel. If the throttle position is greater than zero, a determination is then made whether the vehicle speed is less than a predetermined speed, for example, 35 mph. If it is not, the VSC 71 commands the engine to a conventional driving mode. If, however, the vehicle speed is less than 35 mph, the pressure from the high pressure accumulator 30 is checked. If it is not above a minimum threshold, the VSC 71 commands the engine to a conventional driving mode. If the pressure of the high pressure accumulator is above the minimum threshold, the VSC 71 then signals the control module 44 to operate the pump-motors 22, 24 as motors to provide torque to the vehicle wheels 14, 16.

To facilitate use of the pump-motors 22, 24 as motors, the control module opens valves on the high and low pressure accumulators 30, 34, sends a control pressure to the pump-motors 22, 24 to operate in the motor mode, and sets the pressure ratio of the transformer 32. As in the braking mode, it is then determined whether the pressure ratio of the transformer is at a maximum, or if the pressure of the pump-motors 22, 24 is at a maximum. If it is, the engine is operated in conjunction with the hydraulic motors 22, 24. If the pressure ratio is not at a maximum, and if the pressure of the pump-motors 22, 24 is not at a maximum, the transformer 32 is used to generate the pressure required by the pump-motors 22, 24.

Figure 3:
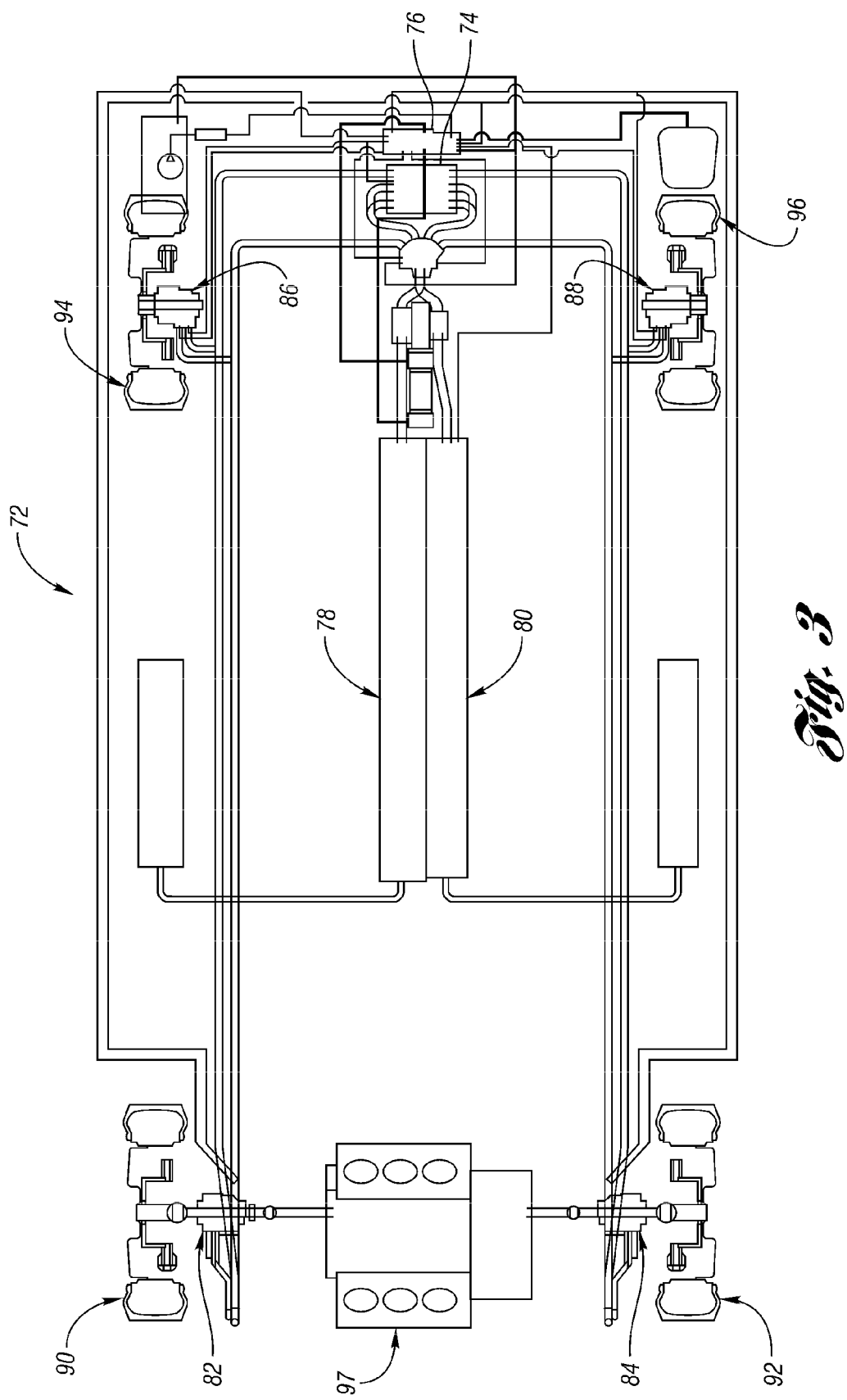
FIG. 3 is a schematic representation of a system in accordance with a second embodiment of the present invention.

The embodiment of the present invention shown in FIG. 1 includes two pump-motors 22, 24. It is not required to use two pump-motors, as a single pump-motor could be used to receive braking energy from, and provide torque to, two vehicle wheels, such as the wheels 14, 16. In addition, the present invention also contemplates the use of more than two pump-motors, for example, in a four wheel drive assist configuration, as shown in FIG. 3. FIG. 3 shows a system 72, configured with similar components as the system 10, shown in FIG. 1. Thus, the system 72 includes a transformer 74, a control module 76, and high and low pressure accumulators 78, 80. Unlike the system 10, the system 72 includes four pump-motors 82, 84, 86, 88, mounted proximate four corresponding wheels 90, 92, 94, 96. Such a configuration allows the system 72 to store braking energy from the front and rear wheels, and also provides an option to supply torque to all four wheels 90, 92, 94, 96 in an otherwise two wheel drive vehicle.

It is worth noting that a four wheel regenerative system, such as the system 72, can be configured to operate in a four wheel drive assist mode as well as a regenerative mode. As described above, the high pressure accumulator 78 can provide fluid to all four pump-motors 82, 84, 86, 88, so that each operates as a motor in the regenerative mode. Alternatively, in a four wheel drive assist mode, an engine 97 can be used to provide all of the torque to the front wheels 90, 92 (or to the rear wheels in a rear wheel drive vehicle). This allows the front pump-motors 82, 84 to operate as pumps to provide pressurized fluid to the rear pump-motors 86, 88, which operate as motors. This facilitates the application of driving torque to the rear wheels 94, 96 on a continuous basis, since there is no dependency on the use of stored energy from the high pressure accumulator 78. The control module 76 can be programmed to implement this drive strategy, so that a regenerative braking system, such as the system 72, needs little additional hardware to implement a four wheel drive assist operation. Including a four wheel drive assist option on a regenerative system, such as the system 72, takes advantage of shared components, and provides a cost effective, mass effective, vehicle drive train with features that appeal to a large segment of vehicle owners.

Figure 4:
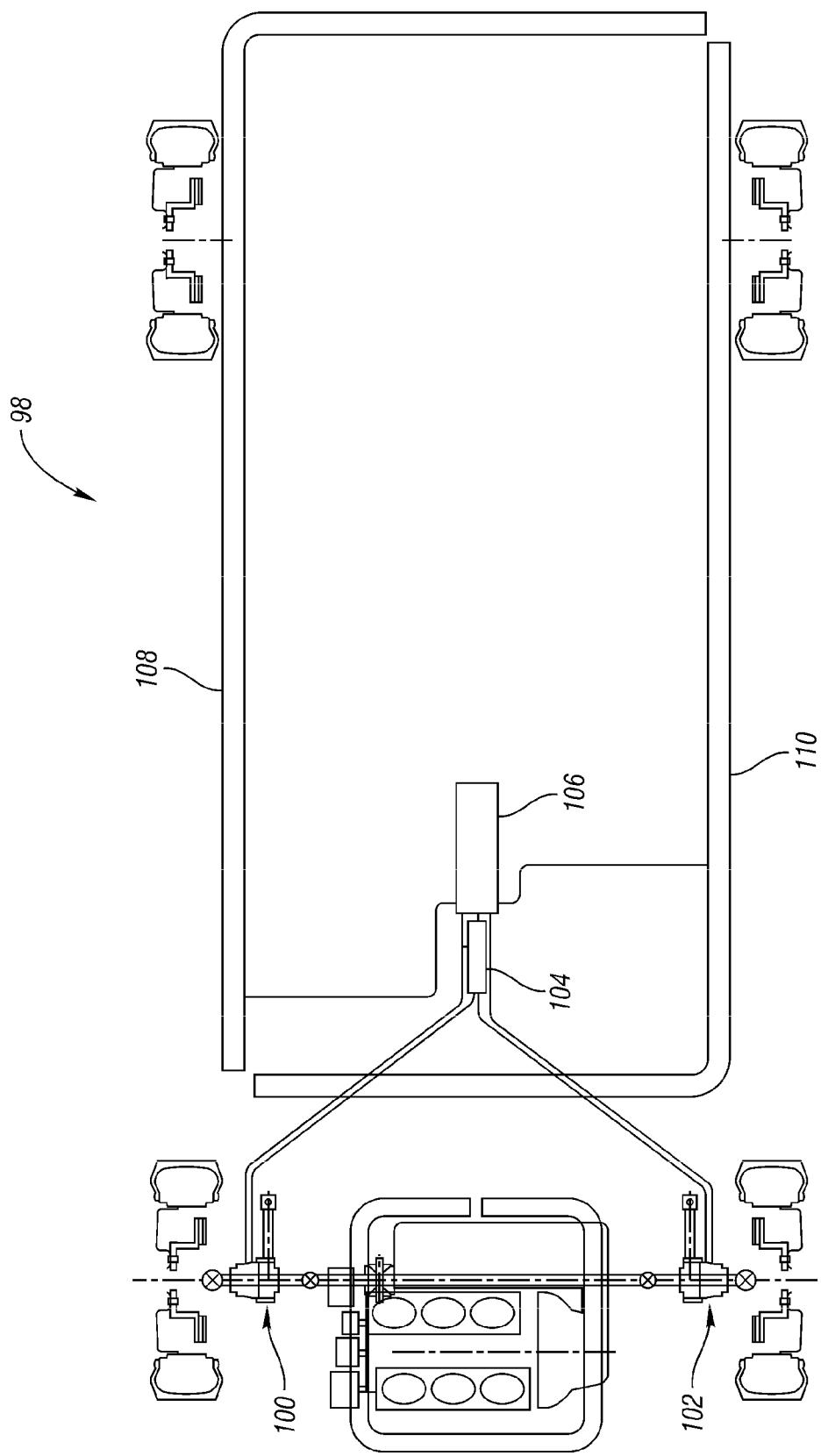
FIG. 4 is a schematic representation of a system in accordance with a third embodiment of the present invention.

In FIGS. 1 and 3, the high and low pressure accumulators are containers separate from the vehicle frame. As an additional space saving measure, a hydraulic regenerative braking system, such as the system 10, can be configured with accumulators that are hydroformed components which makeup some of the vehicle frame. For example, FIG. 4 shows a hydraulic regenerative braking system 98, similar to the systems 10, 72 shown respectively in FIGS. 1 and 3. Though configured somewhat differently from the other two systems, the system 98 includes two hydraulic pump-motors 100, 102.

The system 98 also includes a hydraulic transformer 104, and a control module 106. In addition, the system 98 also includes a high pressure accumulator 108, and a low pressure accumulator 110, both of which are hydraformed, tubular members.

The accumulators 108, 110 not only contain pressurized fluid, used by the system 98 as described above with reference to the system 10, but also form a part of the vehicle frame. Although the accumulators 108, 110 are each shown as a single container, one or both could be split into separate liquid/gas and gas only containers, as shown in FIGS. 1 and 3. Moreover, where an accumulator is configured with two containers as described above, it may be desirable to make only one of the containers—e.g., the gas only container—a hydraformed vehicle frame member, while making the other container—e.g., the liquid/gas container—a conventional storage tank.

Figure 5:
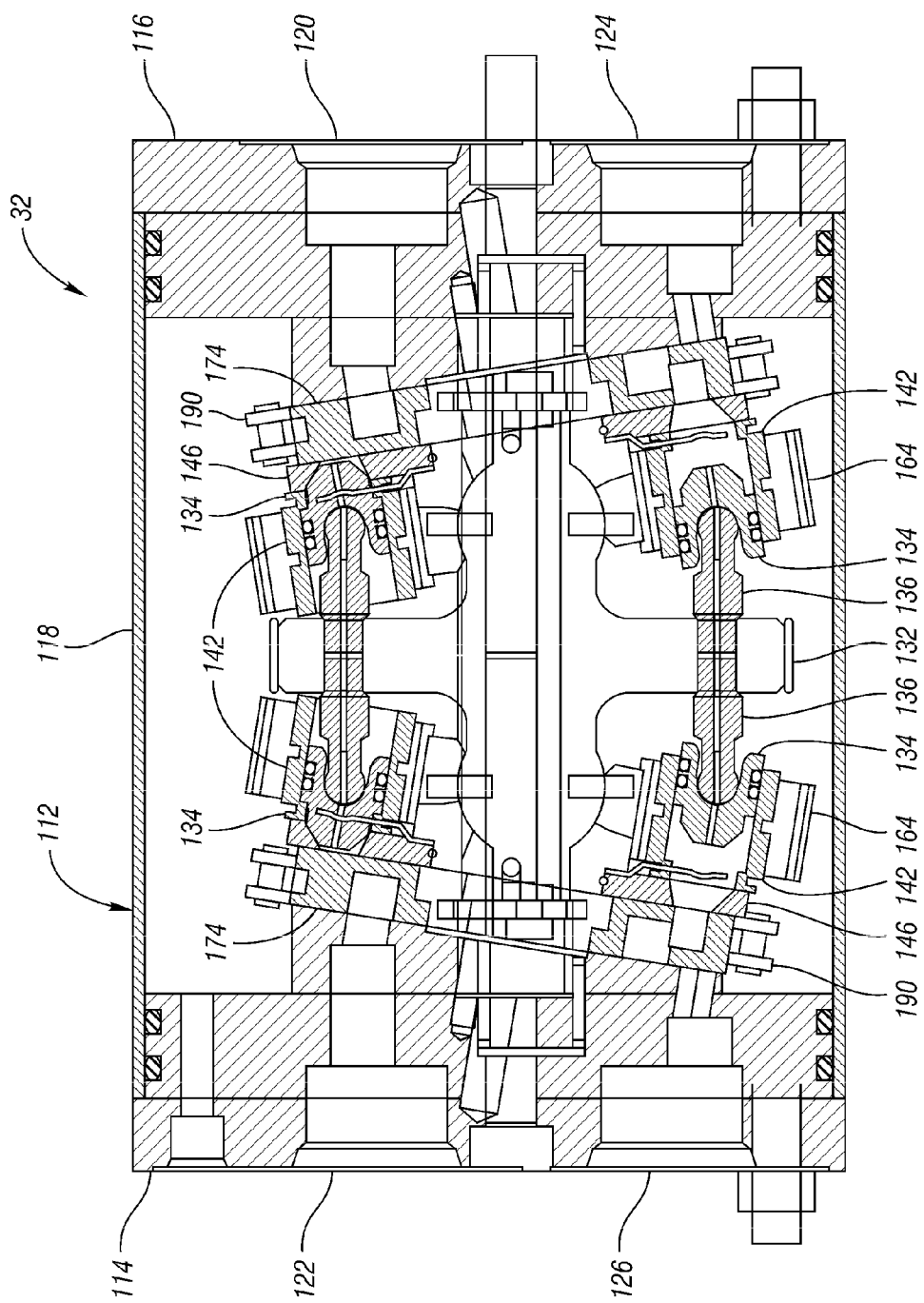
FIG. 5 is a cross-sectional view of a transformer shown in FIG. 1.
Figure 6:
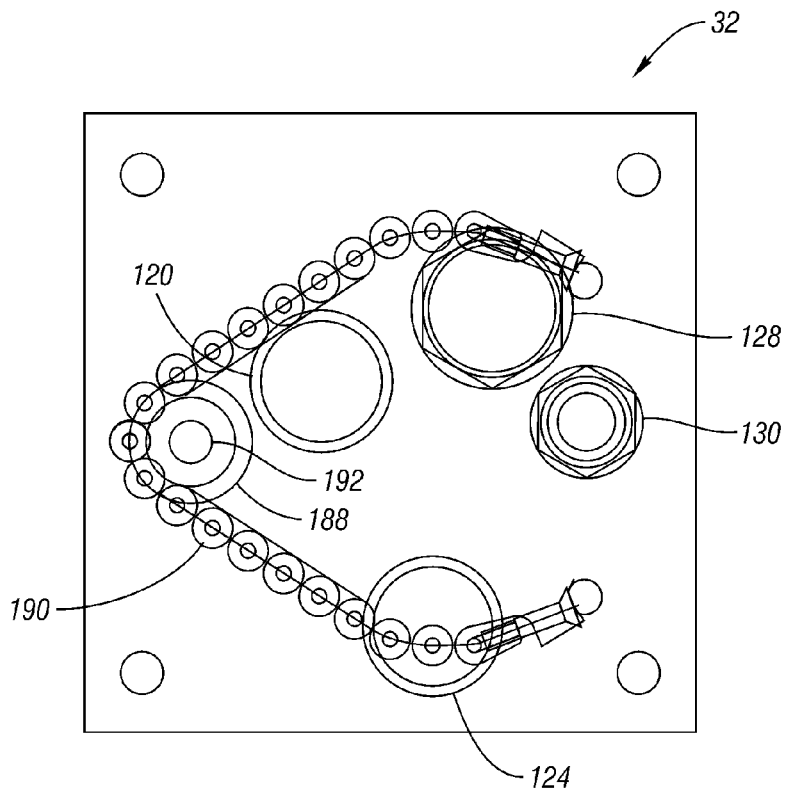
FIG. 6 is a side view of the transformer shown in FIG. 5.

FIG. 5 shows a cross-sectional view of the transformer 32, shown schematically in FIG. 1. The transformer includes a housing 112, which itself includes two end plates 114, 116, and an outer housing 118. The housing 112 includes high pressure ports 120, 122 and low pressure ports 124, 126. FIG. 6, which shows a right side view of the transformer 32, shows the high and low pressure ports 122, 124, and also shows a machine port 128, which connects to the pump-motors 22, 24. There is another machine port on the left side of the transformer 32, which is not visible in the figures. Thus, the transformer 32 provides a three-way junction between the pump-motors 22, 24, the high pressure accumulator 30, and the low pressure accumulator 34. Also shown in FIG. 6 is a relief valve 130, which provides an outlet for the fluid if the pressure at the pump-motors 22, 24 exceeds a predetermined value.

Figure 7:
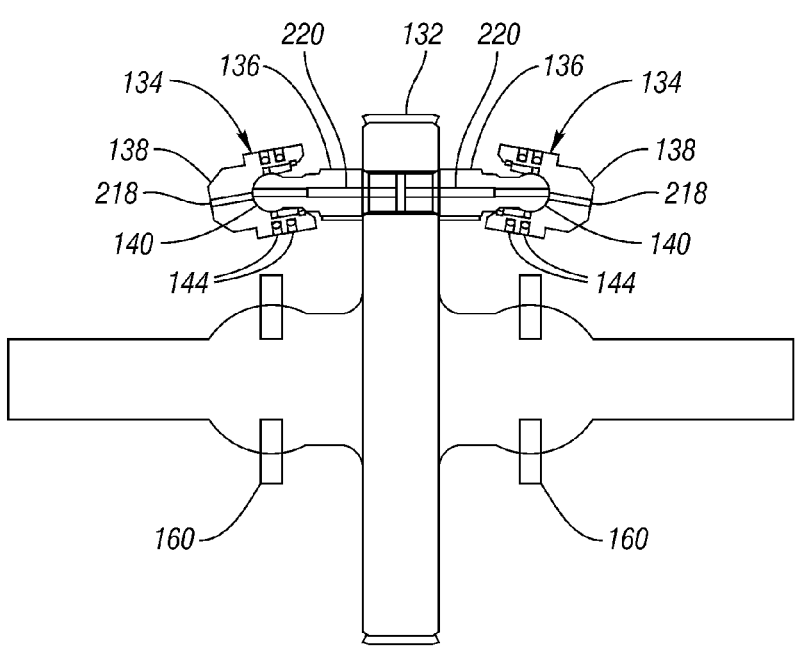
FIG. 7 is a front view of a rotor and pistons shown in FIG. 5.

Returning to FIG. 5, it is shown that the transformer 32 includes a rotor 132, having a plurality of pistons 134 attached to it. Each side of the transformer 32 includes nine pistons 134, only four of which are shown in FIG. 5. Although the embodiment shown in FIG. 5 includes nine pistons 134, a transformer, such as the transformer 32, may include more or less than nine pistons, with numbers of pistons that are multiples of three being particularly desirable. As best shown in FIG. 7, each of the pistons 134 has a two-piece configuration, including a shaft 136 and a head 138. Each of the shafts 136 includes a generally spherical end 140, which cooperates with a corresponding head 138. This configuration allows the piston heads 138 to pivot relative to their corresponding piston shafts 136, which, as described below, provides an advantage over one-piece piston designs.

As shown in FIG. 5, the transformer 32 also includes a plurality of cylinders, or floating cups 142. Each of the floating cups 142 is configured to receive a corresponding piston 134, and as shown in FIG. 5, each of the floating cups 142 has a cylinder axis that is non-parallel to its corresponding piston shaft 136. Because of this non-parallel orientation, a one-piece piston, or any piston with a head rigidly mounted to its shaft, may be difficult to seal. For example, when the piston head is parallel to its shaft, and therefore non-parallel to its corresponding cylinder, the piston head is subject to a radial force. This means that a piston head seal must be configured to seal the interface between the piston head and the cylinder, and to withstand the radial force caused by the non-parallel orientation. This puts great demands on a seal, and may lead to short seal life.

In contrast, the present invention, with its pivoting piston head design, reduces or eliminates the radial forces on the piston head seal. This means that the piston head seal can be designed to perform a single function: seal; it does not need to be designed to also withstand radial forces. In addition, because the contact area at the interface of the piston head and cylinder is greater when the head is parallel to the cylinder, a second seal can be added to the piston head. FIG. 7 shows that each piston head 138 includes two seals 144.

Figure 8A:
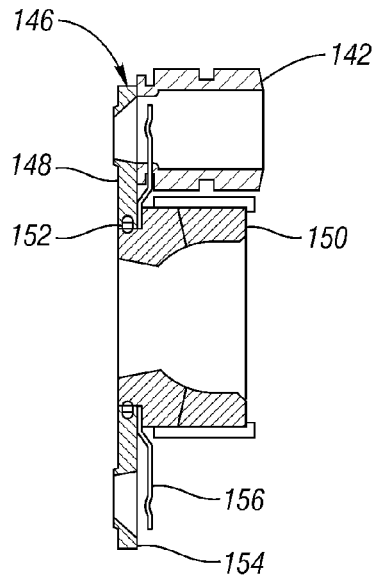
FIGS. 8A and 8B are front and side views of a barrel and a floating cup shown in FIG. 5.
Figure 8B:
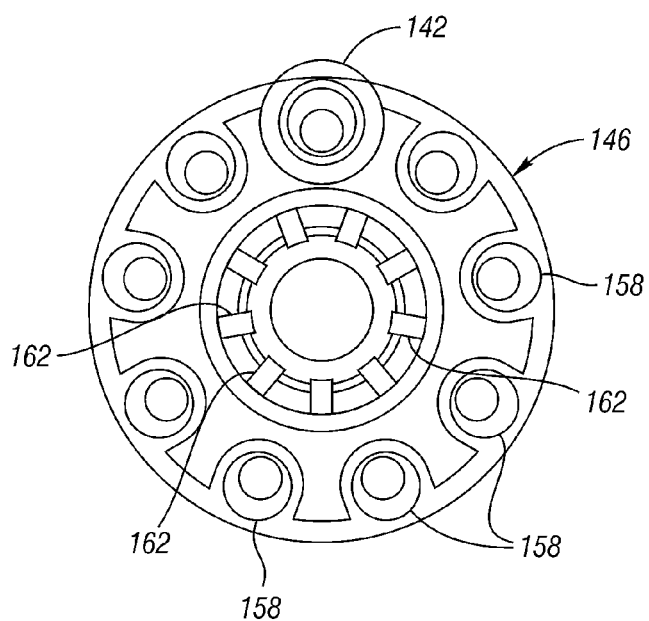

As shown in FIG. 5, the transformer 32 also includes first plates, or barrels 146. FIGS. 8A and 8B show one of the barrels 146, with a floating cup 142 in contact with it. Each of the barrels 146 includes a plate portion 148 and a hub portion 150, which is attachable to the plate portion 148 using a snap ring 152. Providing the barrels 146 with a two-piece configuration allows the plate portion 148 to be lapped so that a first surface 154 receives a very smooth finish prior to assembling the plate and hub portions 148, 150. Such a smooth finish is important to maintain a good seal between each of the floating cups 142 and their corresponding barrel 146.

The piston cylinders, or floating cups 142, are said to be floating since they move with respect to their corresponding barrels 146, and are not rigidly attached to it. There are some floating cup designs known in the art, so a full explanation of their basic operation is not provided here. Although the floating cups 142 of the present invention do move relative to their respective barrels 146, they are somewhat restrained by the use of a spring clip 156. This helps to maintain contact between the cups 142 and the barrels when there is little or no fluid pressure to maintain the contact, for example, when the system 10 is deactivated.

Figure 9:
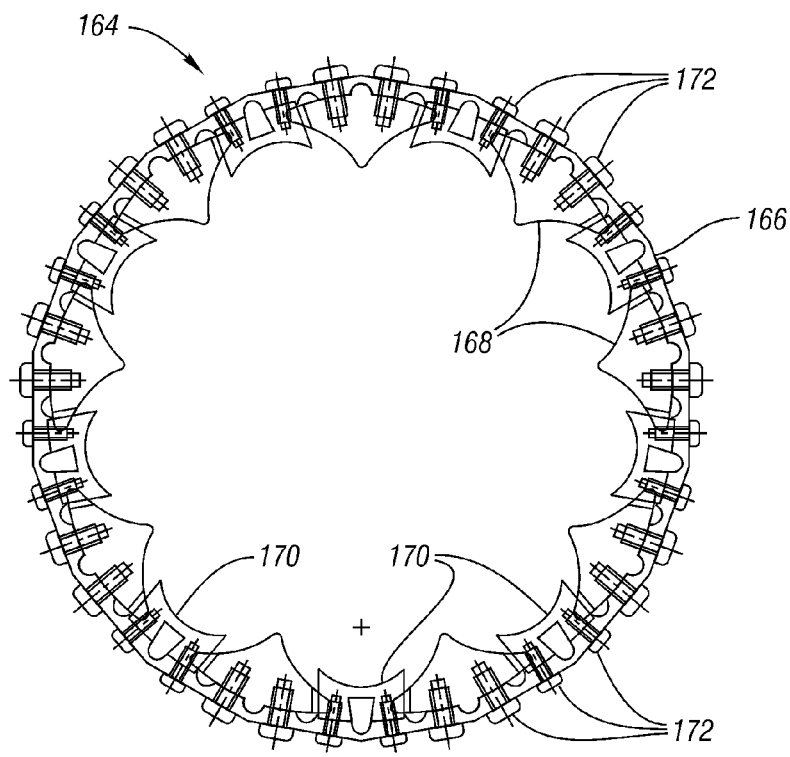
FIG. 9 is a side view of a weighted belt shown in FIG. 5.

As shown in FIG. 9, the barrel 146 includes a plurality of apertures 158 disposed therethrough. In particular, there are nine apertures 158, one for each of the cups 142. The apertures 158 are tapered to allow for the movement of the cups 142 relative to the barrel 146. As explained below, some of the apertures are configured to facilitate fluid flow into corresponding cups 142, and others are configured to facilitate fluid flow out of corresponding cups 142. The barrels 146 are rotatably driven by the rotor 132. The rotor includes a number of pins 160—see FIG. 7—which cooperate with slots 162 within the barrel hubs 150 to facilitate near synchronous rotation of the barrels 146 by the rotor 132.

Because the rotor 132, and therefore the cups 142, may be rotated at relatively high speeds, another constraint, in addition to the spring clips 156, is provided. Specifically, the cups may have a tendency to move radially outward and a second constraint can help inhibit this movement. Each of the sets of cups 142 is therefore provided with a retainer 164 which is circumferentially disposed around the cups 142. FIG. 9 shows a retainer 164, which includes a belt 166 having a plurality of weights 168, equally spaced between links 170. The weights 168 and the links 170 are attached to the belt 166 with fasteners 172. Centrifugal force causes the weights 168 to exert an outward force on the retainer 164, which thereby exerts an inward force on the cups 142 through links 170.

Returning to FIG. 5, it is shown that the transformer 32 includes second plates, or port plates 174. Although the port plates 174 may have any of a number of different configurations, one configuration is shown in FIG. 9. One port plate 174 is shown in FIG. 10. For illustration purposes, it is assumed that the port plate shown in FIG. 10 is on the right side of the transformer 32 shown in FIG. 5. It is understood that a similar description applies to the port plate 174 on the left side of the transformer 32. Returning to FIG. 10, it is shown that the port plate 174 includes three plate ports 176, 178, 180. The port 176 is configured to cooperate with the high pressure port 120 in the transformer housing 112, and three of the apertures 158 in a barrel 146. This facilitates fluid flow between the high pressure accumulator 30 and three of the cups 142.

Similarly, the port 178 is configured to cooperate with the machine port 128 and three different cups 142, to facilitate fluid flow between the pump-motors 22, 24 and three of the cups 142. Finally, port 180, which includes two openings 182, 184 and a partition 186, is configured to cooperate with the low pressure port 124 and the three remaining cups 142. This facilitates fluid flow between the low pressure accumulator 34 and three of the cups 142.

The port plates 174 are rotatable relative to the ports 120, 124, 128 in the transformer housing 112. This allows the pressure ratio of the transformer 32 to be varied. Although a number of mechanisms may be used to rotate the port plates 174, the embodiment shown in the drawing figures uses a sprocket 188 and chain 190—see FIG. 6. The sprocket 188 is driven by a small electric motor 192, which is controlled by the control module 44. The rotatable port plate 174 is designed such that one third of the cups 142 at any one instant connect with the port 176, one third connect with the port 178, and one third connect with port 180. As the cups 142 and barrel 146 rotate past the port plate 174, transitions are such that three cups 142 communicate with each port 176, 178, 180. With the angle between the rotor 132 and the barrel 146, which may be approximately 9', 180' of rotation of the rotor 132 causes the contained fluid volume inside a cup 132 to increase and the remaining 180° of rotation causes the volume to decrease.

Superimposed on these two 180' segments on the barrel 146 are three 120' segments on the port plate 174. Two-thirds of the increasing portion of the rotation typically connect with input pressure, causing it to act as a hydraulic motor and two-thirds of the decreasing portion typically connect with output pressure, causing it to act as a hydraulic pump. The remaining portion of rotation connecting with the low pressure accumulator 34 allows fluid to discharge from and/or fill the cup volume as required. By rotating the three segment port plate 174 in one direction from symmetry relative to the angled barrel 146, the displacement of the input (motor) can be increased while the output (pump) displacement is decreased. This decreases the output flow relative to input flow, allowing output pressure to increase (step up) based on the conservation of power principle. The difference between output flow and input flow is made up by flow to the low pressure accumulator 34. Rotating the port plate 174 in the opposite direction, input (motor) displacement is decreased, output (pump) displacement is increased, and flow difference is made up by flow from the low pressure accumulator 34 to the transformer 32. This is the step down mode of the transformer 32 in which output pressure is less than input pressure and output flow is increased proportionately.

As shown in FIG. 10, each of the ports 176, 178, 180 is generally arcuate, and is disposed a corresponding radius from the center of the port plate 174. The port 180, which connects with the low pressure accumulator 34, is at a larger radius than the ports 176, 178. This allows the port 180 to radially overlap with the ports 176, 178, thereby providing an increase in the pressure ratios provided by the transformer 32. In addition, as noted above, the port 180 includes a partition 186. This allows fluid flow to and from the low pressure accumulator 34 to be completely blocked, thereby improving the efficiency of the transformer 32 when a 1:1 ratio is desired. Because the partition may not completely block the fluid flow to and from the low pressure accumulator 34, a small channel 194 is provided between the openings 182, 184, thereby allowing some fluid to flow between them. Similar channels can be provided in the end plates 114, 116 of the transformer housing 112, to allow a small amount of fluid to flow between the ports 176, 178.

Other port plate designs are contemplated by the present invention. For example, FIG. 11 shows a cross section of a port plate 196. Shown in the cross section are two ports 198, 200, with a third not visible. One side 202 of the port plate 196 is configured to cooperate with an end cap, such as the end plate 114, shown in FIG. 5. The other side 204 of the port plate 196 is configured to cooperate with a barrel, such as the barrel 146. As shown in FIG. 11, each of the ports 198, 200 is located at a radial distance from center axis 206 that is different for the two different sides 202, 204. This configuration allows for increasing the size of the ports in the transformer housing 112, thereby increasing the flow capability of the transformer 32.

Regardless of the particular port design, a port plate can be configured to cooperate with corresponding apertures in a barrel, such as the apertures 158 in the barrel 146, to maintain a generally constant contact area no matter what the relative positions of the port plate and the barrel. For example, FIGS. 12A and 12B shows a projection of three ports 208, 210, 212 and nine barrel apertures 214. In FIG. 12 A, each port 208, 210, 212 contains two apertures 214, leaving a total of three of the apertures 214 completely outside a port. In FIG. 12B, the barrel has rotated, changing the position of the apertures 214 relative to the ports 208, 210, 212. Despite this change in relative position, the projected area of the apertures outside the ports 208, 210, 212, still totals that of three apertures—the same as in FIG. 12A. The design of the ports 208, 210, 212 is such that this relationship is maintained, regardless of the relative positions of the port plate and the barrel.

The transformer 32 is designed to inhibit pressure spikes, thereby reducing the forces on the transformer components, and increasing component life. For example, FIG. 13 shows a side view of the rotor 132, including a plurality of shuttle valves 216, each of which communicates with a pair of ports 217. Each of the shuttle valves 216 are configured to provide a fluid path between a corresponding pair of cups 142. As shown in FIG. 7, each piston head 138 includes a channel 218 that communicates with a channel 220 in corresponding piston shafts 136. This allows fluid to flow between the cups 142 and the shuttle valves 216, thereby inhibiting pressure spikes, particularly when the fluid changes pressure in the transformer 32.

A detail view of a shuttle valve 216 is shown in FIG. 14. Each shuttle valve 216 includes a piston 222. The pistons 222 are specifically designed to inhibit impact which might otherwise reduce component life. For example, each piston 222 is configured with radii 224, which reduce or eliminate metal to metal impact by trapping fluid when the piston 222 approaches the end of a stroke. This provides additional reliability for a transformer, such as the transformer 32.

Figure 15A:
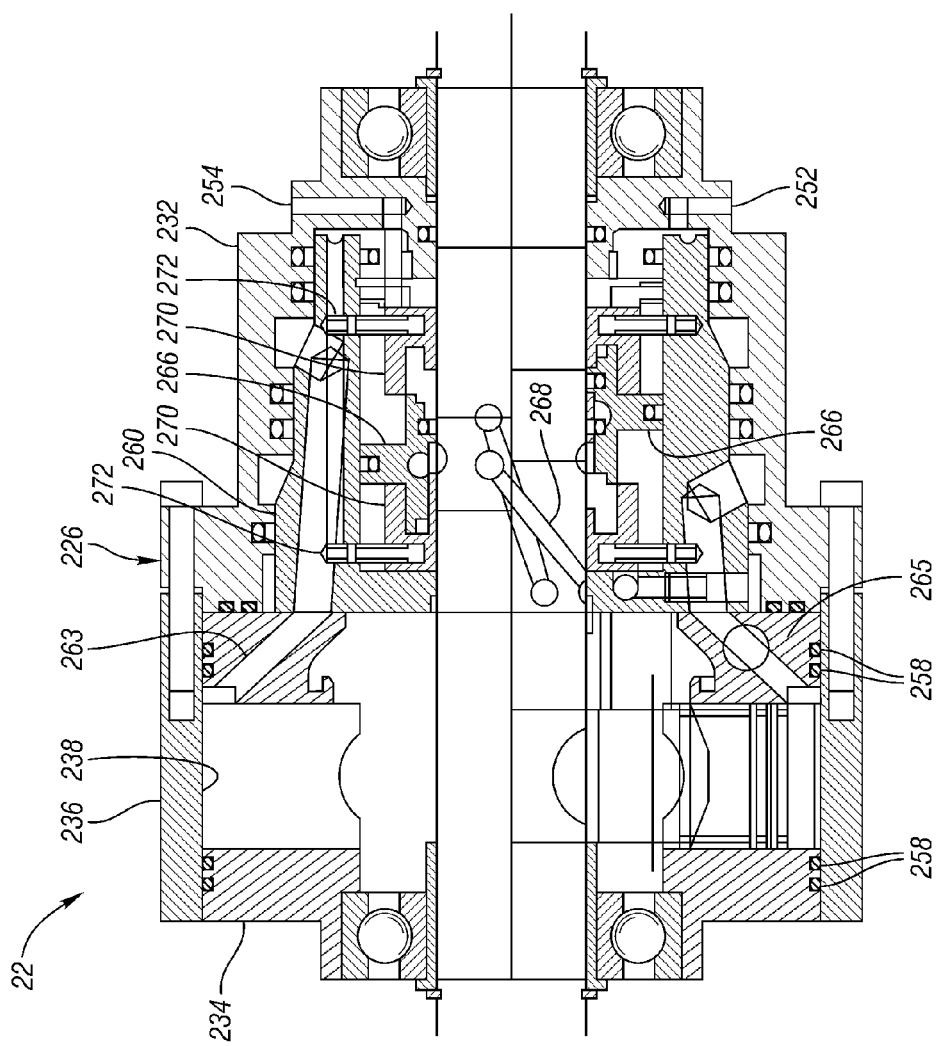
FIGS. 15A and 15B are plan views of a pump-motor shown in FIG. 1.
Figure 15B:
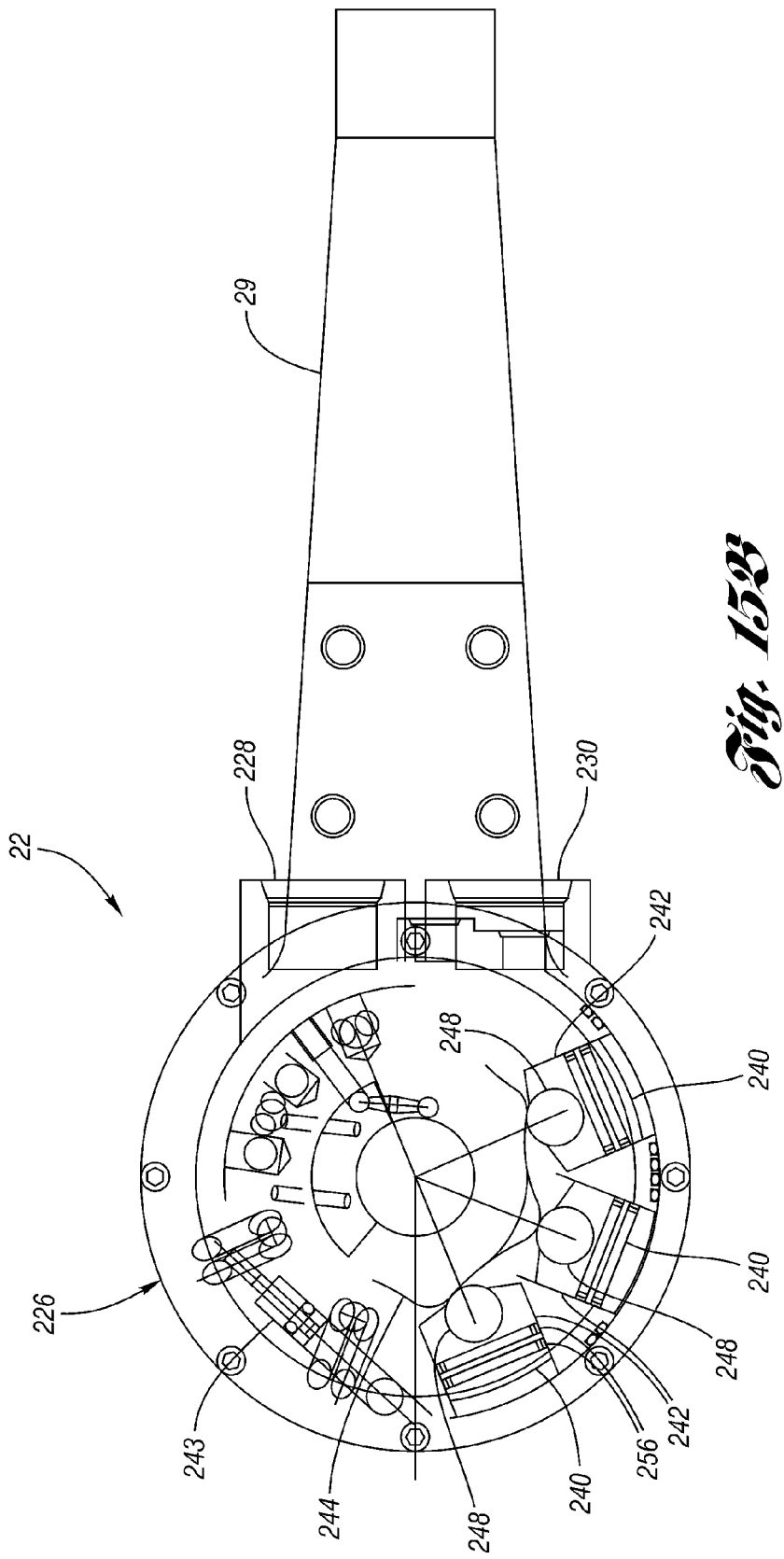

Turning now to the pump-motors, FIGS. 15A and 15B show two views of the pump-motor 22; although, the pump-motor 24 is constructed the same as the pump-motor 22. The pump-motor 22 includes a housing that includes a high pressure fluid port 228, and a low pressure fluid port 230. The housing 226 includes first and second housing portions 232, 234, and an outer ring 236 having a tapered bore 238. The first housing portion 232 includes the high and low pressure ports 228, 230. The second housing portion includes eight radial pistons 240, three of which are shown in FIG. 15B. Each of the pistons 240 are configured to reciprocate within a corresponding cylinder 242, thereby pumping fluid when the pump-motor 22 is operating as a pump, and providing torque when the pump-motor 22 is operating as a motor. The housing 226 is also configured with a plurality of shuttle valves 243, configured similarly, and provided for the same purpose, as the shuttle valves 216 in the transformer 32.

Figure 16:
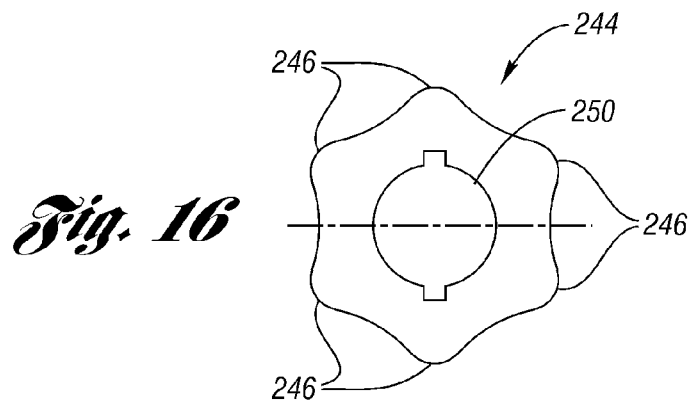
FIG. 16 is a plan view of a cam shown in FIG. 15B.

A portion of a cam 244 is shown in FIG. 15B, and shown in its entirety in FIG. 16. The cam 244 is disposed in the housing 226, and is inboard of the pistons 240. This conserves space and provides a more compact packaging arrangement for the pump-motor 22, especially when compared to pump-motors having a cam circumferentially disposed outside the pistons 240. Moreover, by having the cam 244 inboard of the pistons 240, the pistons 240 can be configured to move radially outward away from the cam 244, thereby disengaging the pistons 240 from the cam 244, and conserving energy when the pump-motor 22 is not needed. This may be accomplished, for example, by providing a slight pressure differential to move the pistons outward when the system is disengaged. Another advantage of the inboard cam 244 is the reduced rolling velocity of the cam followers 248. Noise produced by hydraulic machinery is largely speed related, so reducing rolling velocity, as the present invention does, reduces noise.

As shown in FIG. 16, the cam 244 includes six external lobes 246. Of course, a cam, such as the cam 244, may include more or less than six lobes. The cam 244 cooperates with cam followers 248 on each of the pistons. The cam includes an aperture 250 therethrough, which is configured to be keyed or splined to the driving shaft 26 of the vehicle-see FIG. 1. Thus, the driving shaft 26 turns the cam 244 which operates the pistons 240 to pump fluid to the high pressure accumulator 30 when the pump-motor 22 is operating as a pump—i.e., during vehicle braking. Conversely, when the pump-motor 22 is operating as a motor, the high pressure accumulator 30 provides fluid to the pump-motor 22 to operate the pistons 240, which in turn rotate the cam 244 to provide torque to the driving shaft 26, and thus, the vehicle wheel 14.

Returning to FIG. 15A, it is shown that the first housing portion 232 includes a scavenge port 252 and a mode port 254. The scavenge port 252 provides a flow path back to the transformer 32 for fluid that does not exit via the high or low pressure ports 228, 230. This may include fluid that leaks past the pistons 240, or virtually anywhere else in the pump-motor 22. In order to inhibit such leaks, each piston 240 is configured with a pair of seals 256 to prevent leaks between the piston 240 and the corresponding cylinder 242. In addition, each cylinder head is sealed with a pair of seals 258 which are securely held in place by the tapered ring 236. Thus, the present invention provides for redundant seals not only on the pistons 134 in the transformer 32, but also on the pistons 240 in the pump-motor 22, and at the heads of the cylinders 242 in the pump-motor 22. The pump-motor 22 also has a number of redundant seals in the first housing portion—see FIG. 15A.

Figure 17A:
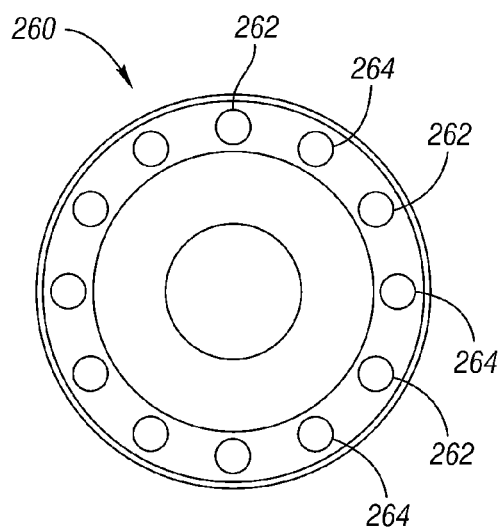
FIGS. 17A and 17B are plan views of a valve plate shown in FIG. 15A.
Figure 17B:
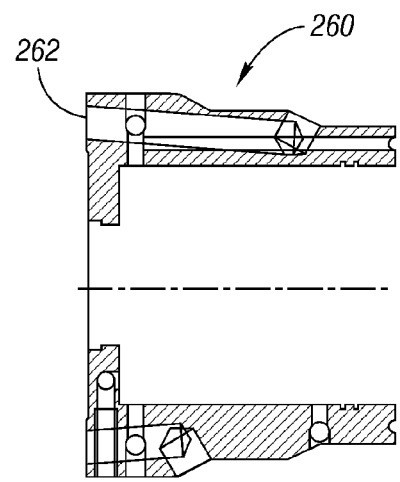

The pump-motor 22 also includes a rotating valve plate 260, shown assembled with the pump-motor 22 in FIG. 15A and isolated in FIGS. 17A and 17B. The valve plate 260 alternatingly includes six apertures 262, which communicate with the high pressure port 228, and six apertures 264, which communicate with the low pressure port 230. The valve plate 260 provides a fluid path between the cylinders 242 and the high pressure port 228 when corresponding pistons 240 are in a power stroke, and between the cylinders 242 and the low pressure port 230 when corresponding pistons are in an exhaust stroke. This facilitates operation of the motor 22 as a motor.

The valve plate 260 can also provide a fluid path between the cylinders 242 and the high pressure port 228 when corresponding pistons 240 are in an exhaust stroke, and between the cylinders 242 and the low pressure port 230 when corresponding pistons are in a power stroke. This facilitates operation of the pump-motor 22 as a pump. Fluid paths 263, 265 are shown in FIG. 15A in the second housing portion 234. The fluid paths 263,265, and others not shown, facilitate the fluid transfer between the cylinders 242 and the apertures 262, 264 of the valve plate 260.

Figure 18A:
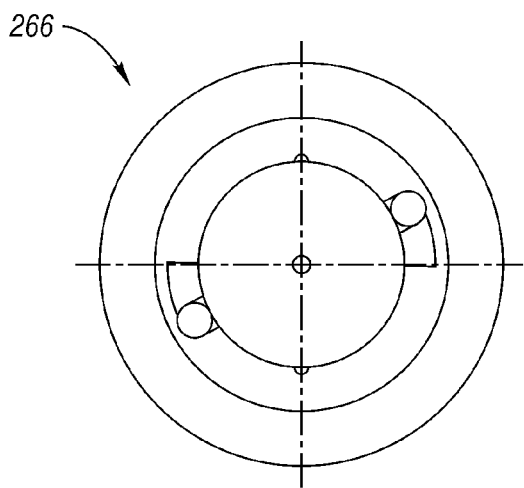
FIGS. 18A and 18B are plan views of an axial piston shown in FIG. 15A.
Figure 18B:
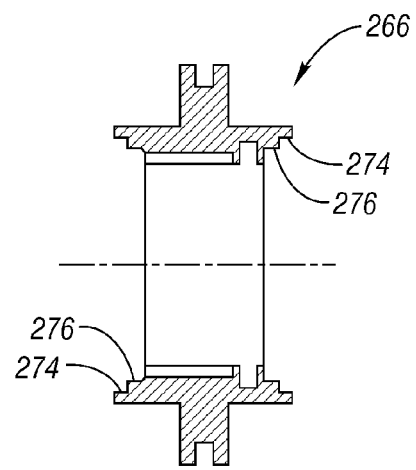

In order to facilitate operation of the pump-motor 22 as both a pump and a motor, the valve plate 260 is indexable relative to the cam 244. To effect the indexing, the pump-motor 22 includes an axial piston 266, which, for illustrative purposes, is shown in FIG. 15A split into two parts, with each of the parts representing the piston 266 in a different position. FIGS. 18A and 18B show the piston 266 in its entirety. The piston 266 may be keyed or splined to the driving shaft 26. The piston 266 drives the valve plate 260 via two or more links 268, which cause the valve plate 260 to rotate as the piston 266 rotates.

In addition, the links 268 translate linear motion of the piston 266 into rotational motion of the valve plate 260, to index the valve plate 260 relative to the cam 244. Movement of the piston 266 in one direction is effected by fluid entering the mode port 254. If necessary, a spring (not shown) can be provided to return the piston 266 to its previous position when the fluid pressure from the mode port 254 is exhausted. When the piston 266 is moved axially, the valve plate 260 rotates such that the apertures 262, 264 change their positions relative to the cam 244. Thus, the pump-motor 22 can be operated as a pump and a motor without rerouting feed lines.

In order to inhibit movement of the piston 266 when the pump-motor 22 is operating at high speed, the pump-motor 22 includes a plurality of weights 270 disposed proximate the piston 266. In particular, each of the weights 270 are constrained by a two-stage spring apparatus 272. The two stage spring apparatus includes a first stage, which maintains the position of the piston 266 relative to the cam 244, such that fluid flow is not prohibited, but it is reduced. This occurs when the apertures 262, 264 provide fluid to the cylinders 242 when the pistons 240 are not at top or bottom dead center. In the second stage, the position of the piston 266 is maintained relative to the cam 244 to prohibit operation of the pump-motor 22. In order to inhibit movement of the piston 266, the weights 270 are configured to mate with two steps 274, 276 on the piston 266—see FIG. 18B. Thus, when the weights 270 engage the first step 274, flow through the pump-motor 22 is reduced, and when the weights 270 engage the second step 276, external flow to and from the pump-motor 22 is prohibited.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A hydraulic machine operable as a variable pressure ratio hydraulic transformer for modifying the pressure, flow rate, or a combination thereof, of fluid flowing through the transformer, the transformer comprising:
    a housing having at least three housing ports, each of the housing ports being configured to operate as a fluid inlet or as a fluid outlet;
    a rotor, rotatably disposed within the housing;
    a plurality of pistons attached to the rotor, each of the pistons including a shaft having a generally spherical end, and a head configured to cooperate with the generally spherical end of the shaft, thereby allowing the head to pivot relative to the shaft;
    a plurality of cylinders, each of the cylinders being configured to receive a corresponding piston, and having a cylinder axis non-parallel to a corresponding piston shaft;
    a first plate configured to be rotatably driven by the rotor, and having a first surface configured to contact one end of each of the cylinders and to allow each of the contacting cylinder ends to slide relative to the first surface, the first plate including a plurality of apertures therethrough, at least some of the apertures being configured to facilitate fluid flow to and from the cylinders; and
    a second plate having at least three plate ports therein, each of the plate ports being configured to cooperate with at least one aperture in the first plate and one housing port, thereby facilitating fluid flow between a housing port and at least one cylinder, the second plate being rotatable relative to the housing ports to modify the transformer pressure ratio.

2. The hydraulic machine of claim 1, wherein the rotor includes a plurality of shuttle valves each of the shuttle valves being configured to provide a fluid path between a corresponding pair of cylinders, thereby inhibiting pressure spikes as the fluid changes pressure in the transformer.

3. The hydraulic machine of claim 2, wherein each of the shuttle valves includes a shuttle piston configured to inhibit shuttle piston impact at the end of a stroke.

4. The hydraulic machine of claim 1, wherein the first plate includes a plate portion having the first surface thereon and a separate hub portion attachable to the plate portion, thereby allowing the first surface to receive a smooth finish prior to assembling the plate portion to the hub portion, thereby facilitating sealing between the first surface and the cylinders.

5. The hydraulic machine of claim 1, wherein the plate ports are configured to cooperate with corresponding apertures such that the projected area of the plate ports and portions of the apertures outside the plate ports is generally constant regardless of the position of the second plate relative to the first plate, thereby inhibiting changes in separation forces between the first and second plates.

6. The hydraulic machine of claim 1, wherein the plate ports are configured to facilitate positioning of the first plate relative to the second plate such that fluid passes through the transformer with no substantial pressure change.

7. The hydraulic machine of claim 1, wherein each of the plate ports is generally arcuate, and is disposed at a corresponding radius from a center of the plate, and wherein one of the plate ports is disposed at a larger radius than the other two port plates, thereby providing radial overlap between plate ports.

8. The hydraulic machine of claim 1, further comprising a retainer circumferentially disposed around the cylinders, thereby inhibiting outward movement of the cylinders when the rotor is rotating at a high speed.

9. A hydraulic machine operable as a pump configured to be driven by a rotating shaft, thereby increasing the pressure of fluid flowing through the pump, the hydraulic machine being further operable as a motor configured to be driven by pressurized fluid, thereby providing torque to a shaft, the hydraulic machine comprising:
    a housing, including a high pressure fluid port and a low pressure fluid port;
    a plurality of radial pistons, each of the pistons being configured to reciprocate within a corresponding cylinder in the housing, thereby pumping fluid when the hydraulic machine is operating as a pump, and providing torque when the hydraulic machine is operating as a motor, each of the pistons including a corresponding cam follower; and
    a cam disposed within the housing, and having a plurality of external lobes configured to cooperate with the cam followers to translate rotational motion of the cam into linear motion of the pistons when the hydraulic machine is operating as a pump, and to translate linear motion of the pistons into rotational motion of the cam when the hydraulic machine is operating as a motor, the cam including an aperture therethrough for receiving a rotatable shaft;

a rotatable valve plate having a plurality of apertures therethrough, at least some of the apertures communicating with the high pressure fluid port and at least some of the apertures communicating with the low pressure fluid port, the valve plate being configured to provide a fluid path between the cylinders and the high pressure fluid port when corresponding pistons are in a power stroke and between the cylinders and the low pressure fluid port when corresponding pistons are in an exhaust stroke, thereby facilitating operation of the hydraulic machine as a motor, the valve plate being further configured to provide a fluid path between the cylinders and the high pressure fluid port when corresponding pistons are in an exhaust stroke and between the cylinders and the low pressure fluid port when corresponding pistons are in a power stroke, thereby facilitating operation of the hydraulic machine as a pump.

10. The hydraulic machine of claim 9, further comprising:
an axial piston; and
a link connecting the axial piston to the valve plate and configured to translate linear motion of the axial piston into rotational motion of the valve plate, thereby facilitating indexing of the valve plate to switch operation of the hydraulic machine between a pump mode and a motor mode.

11. The hydraulic machine of claim 10, further comprising a plurality of weights disposed within the housing and proximate the axial piston, the weights being configured to inhibit movement of the axial piston when the hydraulic machine is operating as a pump at a high speed, thereby indexing the valve plate to reduce the flow of fluid exiting the hydraulic machine.

12. The hydraulic machine of claim 11, further comprising a plurality of two stage spring apparatuses, each of the spring apparatuses being configured to constrain a corresponding one of the weights, a first stage of each of the spring apparatuses maintaining a position of a corresponding one of the pistons relative to the cam such that fluid flow is reduced, a second stage of each of the spring apparatuses maintaining a position of a corresponding one of the pistons relative to the cam such that fluid flow is prohibited.

13. The hydraulic machine of claim 9, wherein the housing further includes first and second housing portions, and an outer ring, the first housing portion including the high and low pressure fluid ports, the second housing portion including the cylinders disposed therein, and the outer ring including a tapered bore to facilitate sealing of each of the cylinders.

14. A hydraulic machine, comprising:
a housing having one portion with a plurality of radially oriented cylinders disposed therein, and another portion configured to be disposed substantially around the one portion and including a tapered bore to facilitate sealing of the cylinders, the housing including a high pressure fluid port and a low pressure fluid port;
a plurality of pistons, each of the pistons being configured to reciprocate within a corresponding cylinder in the housing and including a corresponding cam follower;
a cam disposed within the housing, and having a plurality of lobes configured to cooperate with the cam followers such that effecting a relative rotational motion between the cam and the housing effects linear motion of the pistons, and effecting linear motion of the pistons effects a relative rotational motion between the cam and the housing; and
a rotatable valve plate having a plurality of apertures therethrough, and configured to selectively connect the cylinders with the low pressure fluid port and high pressure fluid port.

15. The hydraulic machine of claim 14, further comprising:
an axial piston; and
a link connecting the axial piston to the valve plate and configured to translate linear motion of the axial piston into rotational motion of the valve plate, thereby facilitating indexing of the valve plate to switch operation of the hydraulic machine between a pump mode and a motor mode.

16. The hydraulic machine of claim 15, further comprising a plurality of weights disposed within the housing and proximate the axial piston, the weights being configured to inhibit movement of the axial piston when the hydraulic machine is operating as a pump at a high speed, thereby indexing the valve plate to reduce the flow of fluid exiting the hydraulic machine.

17. The hydraulic machine of claim 16, further comprising a plurality of two stage spring apparatuses, each of the spring apparatuses being configured to constrain a corresponding one of the weights, a first stage of each of the spring apparatuses maintaining a position of a corresponding one of the pistons relative to the cam such that fluid flow is reduced, a second stage of each of the spring apparatuses maintaining a position of a corresponding one of the pistons relative to the cam such that fluid flow is prohibited.

18. The hydraulic machine of claim 14, wherein the housing is configured to be substantially rotationally stationary, such that relative rotational motion between the cam and the housing is effected by rotation of the cam.

19. A compact hydraulic machine operable as a pump and a motor, and configured to be disposed on a vehicle driving shaft proximate a vehicle wheel, the hydraulic machine comprising:
a housing, including a first housing portion, a second housing portion, and an outer ring, the first housing portion including a high pressure fluid port and a low pressure fluid port, the second housing portion including a plurality of radially oriented cylinders disposed therein, and the outer ring including a tapered bore to facilitate sealing of each of the cylinders;
a plurality of pistons, each of the pistons including a cam follower, and being configured to reciprocate within a corresponding cylinder;
a cam disposed within the housing, and having a plurality of external lobes configured to cooperate with the cam followers to translate rotational motion of the cam into linear motion of the pistons when the hydraulic machine is operating as a pump, and to translate linear motion of the pistons into rotational motion of the cam when the hydraulic machine is operating as a motor, the cam including an aperture therethrough for receiving a rotatable shaft; and
a rotatable valve plate having a plurality of apertures therethrough, and configured to selectively connect the cylinders with the low and high pressure fluid ports, thereby alternately facilitating operation of the hydraulic machine as a pump and a motor.

* * * * *